April 20, 1943.　　T. B. FLANAGAN　　2,316,947
WEIGHING SCALE
Filed July 29, 1941　　2 Sheets-Sheet 1

INVENTOR.
Thomas B. Flanagan.
BY
Corbett, Mahoney + Miller
ATTORNEYS

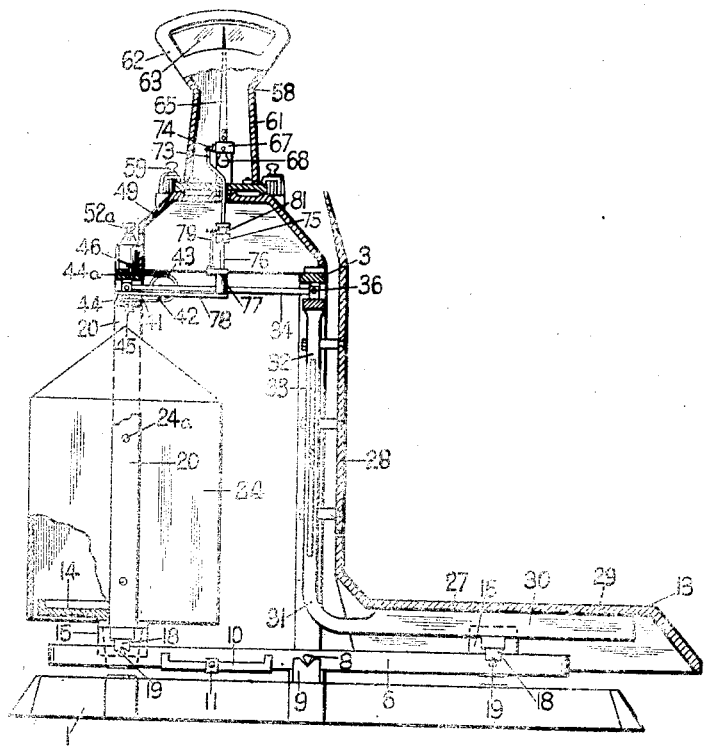
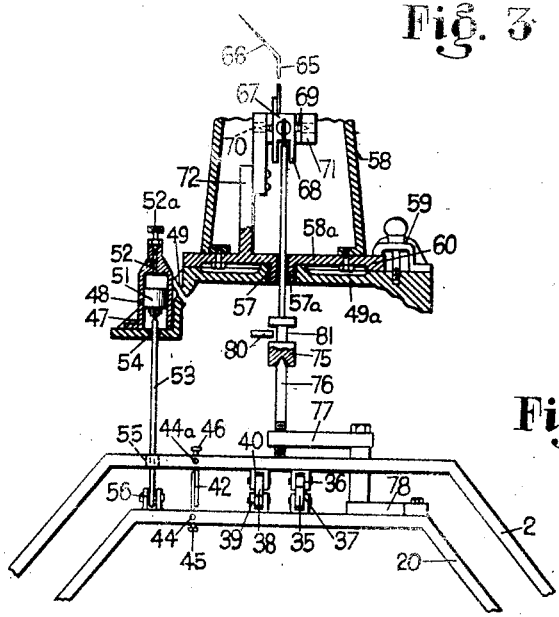

Patented Apr. 20, 1943

2,316,947

UNITED STATES PATENT OFFICE 2,316,947

WEIGHING SCALE

Thomas B. Flanagan, Columbus, Ohio, assignor to The Exact Weight Scale Company, Columbus, Ohio, a corporation of Ohio Application July 29, 1941, Serial No. 404,533

9 Claims. (Cl. 265—54)

My invention relates to a weighing scale. It has to do, more particularly, with a platform scale which is of the over and under weight type.

In the prior art, various platform scales have been provided. Some of these platform scales have been of the over and under weight type. However, they are usually of such a nature that dust will collect on various exposed parts thereof and will interfere with accurate weighing. Thus, such prior art scales are not entirely accurate when used in such places as flour mills, et cetera, where considerable dust is present where the weighing operation is being performed. The weighing platforms of prior art scales of this general type are usually disposed at a distance from the floor level which is considerable, thereby requiring considerable effort, on the part of the operator, when placing commodities to be weighed thereon or removing weighed commodities therefrom. Furthermore, prior art platform scales are usually of such construction that considerable movement of the platform is required to bring the scale into balance when weighing commodities thereon, thereby requiring considerable time to perform the weighing operation. Another disadvantage of prior art scales of this general type resides in the fact that the weight-indicating dial is so located that it cannot be readily seen by the operator from an upright standing position. Furthermore, the dial of prior art scales has not been adjustable so that it could be read from any position around the scale.

One of the objects of my invention is to provide a platform scale of the over and under weight type which is of such a nature that it will be particularly useful in mills or other places where considerable dust is encountered since the counterweights and other parts of the scale will be protected from the accumulation of dust.

Another object of my invention is to provide a platform scale of the type indicated which has the platform located very close to the floor level to facilitate placing of commodities to be weighed on the platform or removal of weighed commodities from the platform.

Another object of my invention is to provide a platform scale which has a high back rest associated with the platform to prevent tipping of tall sacks or the like in which the commodity is placed.

Another object of my invention is to provide a platform scale of the over and under weight type which is of such a nature that the platform will have a short fall thereby rendering the weighing operation more speedy.

Another object of my invention is to provide a weighing scale of the type indicated wherein the weight-indicating dial is disposed at an angle relative to the vertical to facilitate reading of the dial by the operator from an upright position.

Another object of my invention is to provide a scale of the type indicated in the preceding paragraph wherein the dial is so mounted that it may be adjusted to any desired position about a vertical axis to permit reading of the dial from any position around the scale.

Another object of my invention is to provide a weighing scale of the over and under weight platform type which is of such a nature that it will weigh accurately in any ordinary out-of-level position.

Another object of my invention is to provide a weighing scale of the type indicated which is of simple structure and which is relatively light in weight so that it will be portable.

In its preferred form, my invention contemplates the provision of a scale embodying a base having a lever of the even balance type supported thereon. This lever carries at its opposite ends pivotally mounted commodity and counterweight supporting platforms. The commodity platform is disposed at a low level but has a high back rest extending upwardly therefrom. The counterweight supporting platform is enclosed within a housing which is dustproof to protect the weights from accumulations of dust. Both the platforms have upstanding supports associated therewith which extend upwardly to a comparatively high point. At this high point, a checkrod structure is connected to the supports and functions to maintain the platforms in horizontal position regardless of the position of the even balance lever or beam. Connected to one of the said upstanding supports, adjacent the upper end thereof, is a resistance element which is adapted to resist movement of the lever away from balanced position. Also connected to the upper end of one of the said upstanding supports is an operating arm for operating the indicating mechanism of the scale. The indicating mechanism is disposed in a tower at the top of the scale which is rotatable to permit the dial thereof to be viewed from any point around the scale. The tower is provided with an upper portion, having the dial disposed therein, which is at an angle relative to the vertical to permit reading thereof by the operator from an upstanding position.

The preferred embodiment of my invention is illustrated in the accompanying drawings wherein similar characters of reference designate corresponding parts and wherein:

Figure 3 is a view, partly in side elevation and partly in vertical section, of my scale.

Figure 4 is a view, partly in vertical section and partly in elevation, illustrating the indicating mechanism and the dashpot and illustrating their connection to the main part of the scale.

Figures 1, 2:
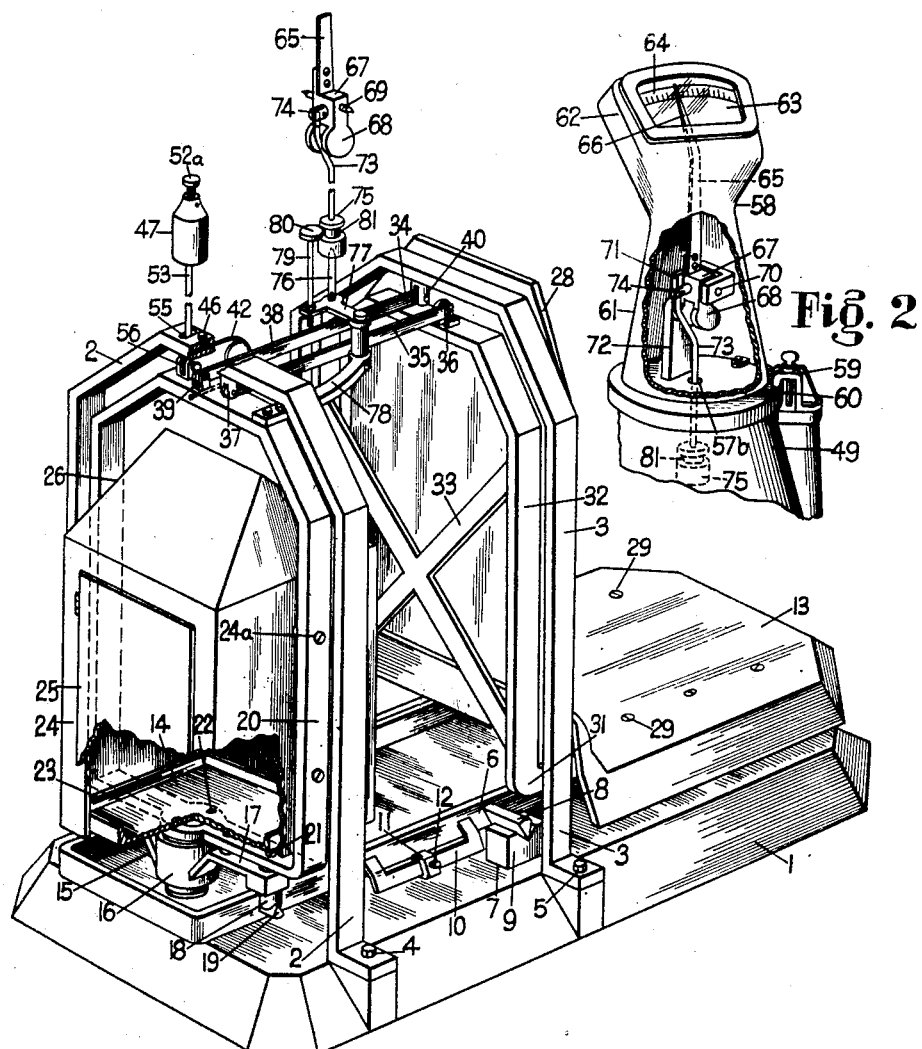
Figure 1 is a perspective view, partly broken away, of a scale made according to my invention.
Figure 2 is a perspective view, partly broken away, of the rotatable tower which encloses the indicating mechanism of my scale.

With reference to the drawings, I have indicated a scale embodying an elongated base 1. This base has upstanding supports or frames 2 and 3 of inverted U-shape bolted to the base as at 4 and 5. These supports 2 and 3 are of considerable height as indicated.

A lever 6 of the even balance type is mounted on the base for swinging movement in a vertical plane by means of a pair of knife-edge pivot structures 7 disposed on opposite sides of the lever. Each of these pivot structures 7 comprises a knife-edge trunnion 8 secured to the lever and which fits into a bearing block 9 secured to the base 1 and having a V-shape notch in the upper surface thereof. The even balance lever 6 is provided with an auxiliary balancing beam 10 secured thereto and carrying an adjustable weight 11 adapted to be held in adjusted position by means of a set screw 12. With this structure, the lever 6 initially may be brought into exact balance. The upstanding support 3 is disposed in alignment with the fulcrum point of the lever 6.

A commodity-receiving platform 13 and a counterweight-receiving platform 14 are carried at the opposite ends of the lever 6. Each of these platforms is supported on the lever 6 by means of an outrider structure 15 illustrated best in Figure 1. Each outrider structure embodies a tubular housing portion 16, which may receive balancing shock, that has a pair of diametrically opposed outwardly extending arms 17. Each of these arms 17 carries on its outer end a bearing block 18 having an inverted V-shaped notch formed in the lower surface thereof. This notch receives an upturned knife-edge formed on a member 19 extending outwardly from the lever 6. Thus, each of the outriders 15 is pivotally carried, through the medium of knife-edge pivot structure, on the lever 6.

To the outrider element 15 which supports the weight platform 14, an upstanding support or frame member 20 is secured. This member 20 is of substantially rectangular form having a converging upper end that is similar in shape to the upper ends of the supports 2 and 3. The lower horizontal portion of the frame 20 is fastened to the arms 17 of the outrider element 15 by means of screws or bolts 21. To the top surface of the horizontal portion of frame 20 the weight-supporting platform 14 is secured by means of screws 22. This platform 14 has an upstanding peripheral flange 23. The platform 14 is adapted to support counterweights to balance the weight of a commodity placed on the platform 13. A dustproof hood 24 has an open lower end which is adapted to be positioned in surrounding relationship to flange 23 of platform 14. Hood 24 is fastened to frame 20 by screws 24a. This hood has a hinged door 25 by means of which the weights may be placed on the platform 14 or removed from the platform without removing the hood. The upper end of the hood 24 is tapered, as indicated at 26, to deter the accumulation of dust. It will be understood that if dust does accumulate on the hood 24, it may be easily and quickly wiped therefrom.

The commodity-receiving platform 13 embodies a lower horizontal portion 27, adapted to support the commodity, and a vertically disposed back rest 28 against which a sack or other container may be tipped. The portion 27 is fastened by means of screws 29 to the horizontal portion 30 of an L-shaped frame or support 31. The portion 28 is similarly fastened to the upstanding or vertical portion 32 of the frame 31. Furthermore, the horizontal portion 30 of member 31 is fastened to its outrider 15 in a manner similar to that in which the frame 20 is fastened to its outrider 15. The upstanding portion 32 of frame 31 is provided with an X-shaped reinforcing web 33.

It will be noted that when the lever 6 is in balanced position, the frame 20 will be disposed within the frame 2 and in alignment therewith. Similarly the vertical portion 32 of frame 31 will be disposed within frame 3 and in alignment therewith. The frames 20 and the portions 32 of frame 31 are just slightly smaller than the frames 2 and 3.

In order to maintain the platforms 13 and 14 in horizontal position, regardless of position of the lever 6, I provide a checkrod structure indicated generally by the numeral 34 and located at the top of the scale. This checkrod structure comprises a checkrod 35 for the platform 13 which is pivotally connected, as at 36, to the upper end of the portion 32 of movable frame 31. The opposite end of this checkrod is pivotally connected, as at 37, to the upstanding stationary frame 2 at its upper end. Similarly, a checkrod 38 is provided for the platform 14 and has its one end pivotally connected to the upper end of the upstanding movable frame 20, as at 39. The opposite end of the checkrod 38 is pivotally connected, as at 40, to the upper end of the stationary frame 3. The checkrods 35 and 38 are disposed in slightly spaced parallel relationship. Each pivotal connection of the checkrods comprises a square hole formed in the checkrod which receives a round pin, as indicated more clearly at the pivot 36. This pivot structure reduces friction.

In order to normally resist movement of the lever 6 away from balanced position, I provide the resistance structure indicated generally by the numeral 41. This resistance structure comprises a flex or spring 42 which is made of suitable heavy wire of annular cross-section. It is preferred to have this spring of annular cross-section rather than flat cross-section as it better resists wear and breakage. The spring 42 is bent into substantially U-shape with a loop or ring 43 being formed therein at the closed end of the U. One leg of this spring 42 is adjustably secured within a socket 44, formed in the top portion of the movable frame 20, by means of setscrew 45. The other leg of the spring is adjustably secured within socket 44a in the upper end of the stationary frame 2 by means of a setscrew 46. The resistance of this spring may be varied by means of variations in the effective lengths of the legs thereof through the medium of setscrew 45 and setscrew 46. The legs of the U-shape spring are normally disposed in horizontal position parallel to each other. When the lever 6 moves away from balanced position, it will be understood that the legs will be forced closer together or farther apart but will tend to resist such movement.

A dashpot structure 47 is also connected to the movable frame 20. This dashpot is of the air type. As shown best in Figure 4, it comprises a cylinder 48 supported on a housing portion 49. A piston 51 is tightly fitted within the cylinder. An air vent 52 is provided in the top of cylinder 48 and is under the control of a needle 52a. The piston 51 has a rod 53 extending downwardly therefrom through a slot 54 formed in the support 49 and through a slot 55 formed in the stationary frame 2. The lower end of the rod 53 is pivotally connected, as at 56, to the upper end of the movable frame 20. The dashpot will act to cushion vibrations of the lever 6 and the platforms which it carries.

It will be noted from Figure 3 that the housing portion 49 is supported on the upper ends of stationary frame 2 and 3 and extends from one to the other. The upper end of this housing portion 49 is closed by a plate 49a which is provided with a centrally disposed opening 57. A tower 58 is bolted to disk 58a which is superimposed on plate 49a. Plate 58a is provided with a centrally disposed depending boss 57a which extends into opening 57. A plurality of clamp members 59 are carried by housing 49 adjacent plate 58a and may be operated to contact the portion 60 of plate 58a and hold the tower 58 in any position to which it is rotated. The tower 58 has a main vertical portion 61 of inverted frusto-conical form and an upper dial-containing portion 62 which is fan-shaped and substantially flat and which has a window 63 formed therein. Within this portion 62 an over and under weight indicating dial 64 is disposed. The portion 62 is at an angle relative to the vertical to permit reading of the dial 64 by the operator when he is standing upright. Thus, the tower is of such a nature and so mounted that reading of the dial from an upright position is possible and also the tower may be rotated to permit reading of the dial from any position around the scale.

In order to indicate whether or not the lever 6 is in balance and its approach to balance, I provide an indicating pointer 65 in the tower 58 for cooperation with the dial 64. This indicating pointer is vertically disposed but has an angularly directed portion 66 as its upper end for movement in the angularly disposed portion 62. The pointer 65 has its lower end mounted on a block portion 67 having depending pendulum weight portions 68. This portion 67 has oppositely extending pointed ends 69 carried thereby which fit into bearing cup 70 carried by a U-shaped member 71. This member 71 is carried on the upper end of a support 72 which is integral with the bottom 58a of the tower 58. Thus, the pointer is pivotally carried within the tower for swinging in a substantially vertical plane and when the tower is rotated, the pointer and its support will rotate therewith.

The pointer 65 is operatively connected to the movable frame 20 in such a manner that rotation of the tower and the pointer may occur without interference. For this purpose a rod 73 is provided which has its upper end pivotally connected, as at 74, to an arm extending outwardly from member 67. This rod passes downwardly through an opening 57b in portion 57a of plate 58a and carries a weight 75 on its lower end. This weight 75 has a cup formed in its lower end for receiving the upper pointed end of a pin 76. The pin 76 is adjustably carried by a bracket 77 which is secured to an arm 78. The arm 78 is rigidly attached to the upper end of the movable frame 20. In order to prevent vibration from accidentally displacing the member 75 from the member 76, the bracket 77 carries an upstanding pin 79 which has a small disk 80 on its upper end that extends into a groove 81 formed in member 75. It will be apparent that when the tower is rotated and the indicator rotates therewith, the member 75 will merely rotate relative to member 76. Member 75 is in alignment with the pivot point of the pointer 65. The weights 68 and the weight of member 75 and associated parts will always keep member 75 in proper contact with member 76. When the lever 6 is moved away from balance, the indicator 65 will move to indicate an over weight or under weight. As the lever is brought back into balanced position, the indicator will indicate the gradual approach to balance. The resistance element 42 will also serve to maintain the pointer 65 in neutral position.

In the use of this scale, counterweights sufficient to balance the commodity to be weighed will be placed within the hood 24. Thus, the weights will be protected from dust. Also, the indicating mechanism, the checkrod structure and the resistance element will be protected from dust by means of tower 58 and housing 49. Because the checkrod structure is at the top of the scale rather than in the base 1, the base may be very shallow and, therefore, the platform 13 may be very low. Furthermore, because of the long lever arms provided by the upstanding portion 32 of frame 31 and the upstanding frame 20, the fall of the platform 13 need only be comparatively small and still an adequate travel of the indicator may be obtained. The high back rest 29 on the platform 13 is also very desirable. The indicator mechanism can be read by the operator from an upright position and the tower can be adjusted so that it can be read from any position around the scales. The scale will weigh accurately in any ordinary out-of-level position. Furthermore, the scale is of simple structure and is relatively light in weight so that it will be portable.

Various other advantages will be apparent from the preceding description, the drawings, and the following claims.

Having thus described my invention, what I claim is:

1. A weighing scale of the platform type comprising a longitudinally extending base, a longitudinally extending lever member fulcrumed on said base at a point substantially midway between the ends thereof for movement in a vertical plane, an inverted-U-shaped upstanding stationary supporting member disposed transversely of said base at one end thereof and having the lower ends of its legs secured to said base, an inverted-U-shaped upstanding stationary supporting member disposed transversely of said base substantially in the same transverse plane as the fulcrum for the lever and having the lower ends of its legs secured to said base, said supporting members being disposed parallel to each other and both extending upwardly to the same extent a considerable distance above the base, an outrider element at each end of the lever extending transversely of the lever and being pivotally connected thereto, an L-shaped platform supporting member for supporting a commodity-receiving platform, said L-shaped supporting member having a horizontally disposed portion which is secured to one of the outrider elements and having an upstanding vertical portion of substantially inverted-U-shape which extends transversely of the lever and is normally disposed within the stationary support disposed intermediate the ends of the base, said upstanding vertical portion extending upwardly to a point adjacent the upper end of said stationary support within which it is normally disposed, a commodity-receiving platform of L-shape secured to said L-shaped support, said platform having an upstanding back which extends upwardly beyond said inverted-U-shaped support but is spaced laterally therefrom, a platform-supporting member for supporting a weight platform, said weight platform-supporting member having a horizontal portion secured to the other of the outrider elements and having an upstanding vertical portion which extends transversely of the lever and is normally disposed within the stationary support secured to the end of the base and extends upwardly to a point adjacent the upper end of said last-mentioned stationary support, a weight-receiving platform secured to the horizontal portion of said weight platform support, said weight-receiving platform including a dust-proof housing for receiving the weights, a check rod structure for maintaining said platforms in substantially horizontal position regardless of the position of said lever, said check rod structure embodying a pair of check rods, one of said check rods having one of its ends connected to the upper end of said stationary support disposed intermediate the ends of the base member and having its opposite end pivotally connected to the upper end of the vertical portion of said weight platform supporting member, the other of said check rods having one of its ends pivotally connected to the upper end of said stationary supporting member at the end of the base and its opposite end pivotally connected to the vertical portion of the L-shaped supporting member for the commodity-receiving platform, said check rod members extending longitudinally of the lever member and being disposed in substantially parallel relationship to each other, a housing supported on the upper ends of said stationary supports, indicating mechanism disposed within said housing, and means for connecting said indicating mechanism to the upper end of the vertical upstanding portion of one of said platform-supporting members.

2. A weighing scale according to claim 1 wherein a resilient element is connected to the upper end of one of said stationary supports and to the upper end of the upstanding vertical portion of one of said platform supporting members to resist movement of the beam away from balanced position.

3. A weighing scale according to claim 1 wherein a dashpot is supported by said indicator housing and is connected to the upper end of the upstanding vertical portion of one of said platform-supporting members.

4. A weighing scale of the platform type comprising a longitudinally extending base, a longitudinally extending lever member fulcrumed on said base at a point substantially midway between the ends thereof for movement in a vertical plane, an inverted-U-shaped upstanding stationary supporting member disposed transversely of said base at one end thereof and having the lower ends of its legs secured to said base, an inverted-U-shaped upstanding stationary supporting member disposed transversely of said base substantially in the same transverse plane as the fulcrum for the lever and having the lower ends of its legs secured to said base, said supporting members being disposed parallel to each other and both extending upwardly to the same extent a considerable distance above the base, an outrider element at each end of the lever extending transversely of the lever and being pivotally connected thereto, an L-shaped platform-supporting member for supporting a commodity-receiving platform, said L-shaped supporting member having a horizontally disposed portion which is secured to one of the outrider elements and having an upstanding vertical portion of substantially inverted-U-shape which is normally disposed within the stationary support disposed intermediate the ends of the base, said upstanding vertical portion extending upwardly to a point adjacent the upper end of said stationary support within which it is normally disposed, a commodity-receiving platform of L-shape secured to said L-shaped support, a platform-supporting member for supporting a weight platform, said weight platform-supporting member having an upstanding vertical portion which extends transversely of the lever and is normally disposed within the stationary support secured to the end of the base and extends upwardly to a point adjacent the upper end of the stationary support, a weight-receiving platform secured to the horizontal portion of said weight platform support, a check rod structure for maintaining said platforms in substantially horizontal position regardless of the position of said lever, said check rod structure embodying a pair of check rods, one of said check rods having one of its ends pivotally connected to the upper end of said stationary support disposed intermediate the ends of the base member and having its opposite end pivotally connected to the upper end of the vertical portion of said weight platform supporting member, the other of said check rods having one of its ends pivotally connected to the upper end of said stationary supporting member at the end of the base and its opposite end pivotally connected to the upper end of the vertical portion of the L-shaped supporting member for the commodity-receiving platform.

5. A weighing scale according to claim 4 wherein indicating mechanism is supported on the upper ends of said stationary supports and is operatively connected to the upper end of the upstanding portion of one of said platform-supporting members.

6. A weighing scale according to claim 4 wherein a resistance spring is connected to one of said stationary supports and to the adjacent upstanding portion of one of said platform-supporting members.

7. A weighing scale according to claim 4 wherein a dashpot is supported by one of said stationary supports and is connected to the adjacent upstanding portion of one of said platform-supporting members.

8. A weighing scale of the platform type comprising a longitudinally extending base, a longitudinally extending lever member fulcrumed on said base at a point intermediate the ends thereof for movement in a vertical plane, an upstanding stationary supporting member disposed transversely of said base at one end thereof and having its lower end secured to said base, an upstanding stationary supporting member disposed transversely of said base substantially in the same transverse plane as the fulcrum for the lever and having its lower end secured to said base, said supporting members extending upwardly to substantially the same extent a considerable distance above the base, an L-shaped platform-supoprting member for supporting a commodity-receiving platform pivotally mounted on one end of said lever, said L-shaped supporting member having an upstanding vertical portion disposed closely adjacent the stationary support disposed intermediate the ends of the base, said upstanding vertical portion extending upwardly to a point adjacent the upper end of said stationary support, a pltaform-supporting member for supporting a weight platform, said weight platform-supporting member having an upstanding vertical portion which is disposed closely adjacent said first-mentioned stationary support and extends upwardly to a point adjacent the upper end of the first-mentioned stationary support, a check rod structure embodying a pair of check rods, one of said check rods having one of its ends pivotally connected to the upper end of said stationary support disposed intermediate the ends of the base member and having its opposite end pivotally connected to the upper end of the vertical portion of said weight platform supporting member, the other of said check rods having one of its ends pivotally connected to the upper end of said stationary supporting member at the end of the base and its opposite end pivotally connected to the upper end of the vertical portion of the L-shaped supporting member for the commodity-receiving platform.

9. A weighing scale of the platform type comprising a longitudinally extending base, a longitudinally extending lever member fulcrumed on said base at a point intermediate the ends thereof for movement in a vertical plane, an upstanding stationary supporting member disposed at one end of said base and having its lower end secured to said base, an upstanding stationary supporting member disposed substantially in the same transverse plane as the fulcrum for the lever and having its lower end secured to said base, an L-shaped platform-supporting member for supporting a commodity-receiving platform pivotally mounted on one end of said lever, said L-shaped supporting member having an upstanding vertical portion disposed closely adjacent the stationary support disposed intermediate the ends of the base, a platform-supporting member for supporting a weight platform, said weight platform-supporting member having an upstanding vertical portion which is disposed closely adjacent said stationary support disposed at one end of the base, and a check rod structure associated with the upper ends of said stationary supports and the upper ends of said upstanding portions of said platform-supporting members.

THOMAS B. FLANAGAN.